United States Patent [19]
McLennan

[11] Patent Number: 5,284,182
[45] Date of Patent: Feb. 8, 1994

[54] WIPER FOR A ROTARY DISK VALVE

[75] Inventor: William R. McLennan, Easton, Pa.

[73] Assignee: Victaulic Company of America, Easton, Pa.

[21] Appl. No.: 842,249

[22] Filed: Feb. 27, 1992

Related U.S. Application Data

[63] Continuation-in-part of Ser. No. 738,182, Jul. 30, 1991, Pat. No. 5,095,946, and a continuation-in-part of Ser. No. 468,351, Jan. 22, 1990, abandoned.

[51] Int. Cl.$^5$ .................. F16L 29/00; F16K 25/00
[52] U.S. Cl. ................. 137/614.01; 137/242; 251/314
[58] Field of Search ............ 137/614.01, 242; 251/304, 314

[56] References Cited

U.S. PATENT DOCUMENTS

| | | | |
|---|---|---|---|
| 4,193,580 | 3/1980 | Norris et al. | 251/304 X |
| 4,382,450 | 5/1983 | Tennick | 137/242 |
| 4,577,659 | 3/1986 | Gembus et al. | 137/614.01 X |
| 4,671,310 | 6/1987 | Henninger | 137/242 |

Primary Examiner—Martin P. Schwadron
Assistant Examiner—Kevin L. Lee
Attorney, Agent, or Firm—Abelman Frayne & Schwab

[57] ABSTRACT

A rotary valve has a wiper member formed from an elastomeric material, the wiper member extending circumferentially of the valve seat, and, in an unstressed condition of the wiper member, extending radially inwardly of said valve seat, the wiper member being operatively positioned for it to wipe clean an outer circumferential surface of the valve member as the valve member is moved from an open position to a closed position, the wiper member being supported for limited movement relative to the valve seat, whereby, upon stressing of the wiper member by the valve member, the wiper member can retract into the valve seat.

3 Claims, 3 Drawing Sheets

WIPER FOR A ROTARY DISK VALVE

This is a continuation-in-part (CIP) of Ser. No. 738,182, filed Jul. 30, 1991, now U.S. Pat. No. 5,095,946 and a continuation-in-part of Ser. No. 468,351, filed Jan. 22, 1990, now abandoned.

FIELD OF THE INVENTION

This invention relates to a wiper for incorporation into a rotary disk valve, the wiper being operative to remove surface contaminants from the periphery of the valve disk as the valve disk moves from an opened position permitting through-flow past the valve disc and a closed position in which the valve disk cooperates with a valve seating of the housing of the valve to inhibit flow through the valve.

BACKGROUND OF THE INVENTION

Rotary disk valves are well-known in the art, and are comprised of a valve disk that is carried by a rotatable shaft. More commonly, the central axis of the shaft extends in, or parallel to, the central plane of the valve disk, but, this is not essential to such a rotary disk valve construction.

U.S. Pat. No. 5,095,946, McLennan, issued Mar. 12, 1992, teaches a disk valve construction in which a composite disk valve is positioned with the central plane of the valve disk extending at an angle to the longitudinal axis of the valve shaft. In that patent, the disk valve specifically is formed at a two-part construction, as is the housing for the disk valve, thus allowing for closure and sealing of the respective halves of the housing by the respective halves of the disk valve prior to separation of the two halves of the housing from each other, thus to provide a dry break coupling.

In the case of the commonly known disk valve, which may have, but does not essentially require an elastomeric seal extending peripherally of the valve disk, the requirement arises that the periphery of the valve disk must be kept free of debris and particulate matter as it moves onto the associated valve seat, especially when the valve is to be employed in pipe lines carrying abrasive slurries. The presence on the edge of the valve disk of abrasive particles can result in leakage past the valve disc, and also result in leakage past the valve disc, and also result in abrasion and scouring of the edge of the valve disk, or, abrasion and scouring of the valve seat with which the valve disk cooperates, and, eventual decrease in the sealing effectiveness of the valve.

While these considerations also can apply in the construction of U.S. Pat. No. 5,095,946, a further and more pressing requirement is present, that being, prior to separation of the valve halves, the requirement to wipe contaminants from the surface of an elastomeric seal that extends peripherally of the valve disk, the liquid contaminants envisaged being of a highly flammable and potentially explosive nature, or other noxious fluids.

SUMMARY OF THE INVENTION

According to the present invention, the housing of the valve is provided with an internal wiper that extends peripherally of the valve seat, and which extends radially inwardly of the valve seat to a small extent when the disk valve is in an opened position, the internal wiper being operative to wipe the periphery of the valve disk clean as the valve disk is moved from the opened position to a closed position in which it cooperates with the valve seat.

When employed in conjunction with a split valve disk as disclosed in U.S. Pat. No. 5,096,946, a wiper is incorporated into each of the coupling halves, the respective wipers, in the assembled condition of the valve housing, cooperating one with the other to further enhance the wiping action of the respective squeegee as the valve disk moves to a closed position in which it cooperates with the valve seat in sealing relationship therewith.

Further, the respective wipers are arranged to cooperate with one another in such a manner that they eliminate any spaces between each other and the associated elastomeric seals on the respective valve disk halves in which fluid could be entrapped.

According to the present invention, a housing for a rotary disk valve has a valve seat with which the periphery of a valve disk cooperates, the housing providing a seating and support for a wiper formed from an elastomeric material, the wiper extending circumferentially of the valve seat.

The seating for the wiper is so arranged that it produces compression of the wiper in the axial direction of the valve axis, in order to cause extrusion of the elastomeric material of the wiper in a direction radially inwards of the valve axis. The seating for the wiper also is so arranged that it provides for displacement of the material of the wiper in a direction radially outwards of the valve axis under the influence of forces imposed on the inner periphery of the wiper by the valve disk as the valve disk moves to a closed position.

In a preferred embodiment of the invention having specific relation to the dry break coupling embodiment of U.S. Pat. No. 5,095,946, each of the housing halves of the coupling is formed to provide a seating for a wiper, and, a separate wiper is incorporated into each of the housing halves. The respective wipers in the assembled condition of the coupling cooperate one with the other to further enhance the wiping action on the periphery of the valve disk in such a manner as to exclude any spaces between the respective wipers and the cooperating edge of the valve disk halves that could otherwise provide space for the entrapment of fluid.

Having so arranged the respective wipers that they are virtually dry and free from any spaces in which fluid can be entrapped, the respective housing halves can then be separated one from the other in what is essentially the total absence of any spillage of the liquid contained in the pipe lines associated with the respective housing halves.

DESCRIPTION OF THE DRAWINGS

A preferred embodiment of the invention and alternative embodiments thereof will now be described with reference to the accompanying drawings, in which.

DETAILED DESCRIPTION OF THE DRAWINGS

Figure 1:
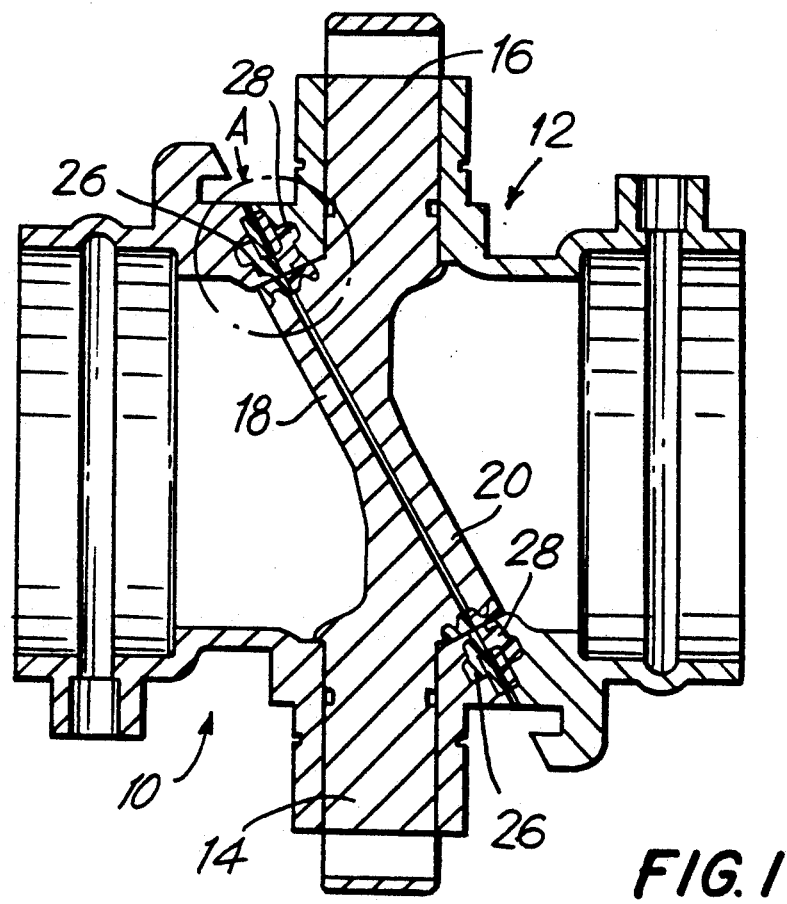
FIG. 1 is a longitudinal cross-section through a valve of the type disclosed in U.S. Pat. No. 5,095,946, showing the valve members in a closed position.

Referring first to FIG. 1, a quick connect coupling is shown in longitudinal cross-section of the type disclosed in U.S. Pat. No. 5,095,946. The coupling comprises two coupling halves which are indicated generally at 10 and 12, the respective coupling halves each incorporating a stub shaft 14, 16 which carries one-half 18, 20 of a composite disk valve.

The stub shafts 14 and 16 are rotatable nominally through an angle of 90°, rotation of that stub shaft producing rotation of the associated valve disk half from a fully opened to a fully closed position or vice versa, the motion of that valve disk half being transmitted to the other of the valve disk halves, thus causing both of the valve disk halves to move in unison.

As is described in U.S. Pat. No. 5,095,946, when the valve disk halves are in the position shown in FIG. 1 of the drawings, the respective coupling halve members can be separated one from the other, separation of the coupling halves occurring in the almost complete absence of spillage of the fluid being conveyed through the respective coupling halves, thus to provide a dry break coupling. Typically, the liquids conveyed by such a coupling will be gasoline, kerosene, aircraft fuel and the like, such liquids being highly flammable and chemicals, effluents and other noxious fluids. When formed of stainless steel, the coupling can be employed for the bulk handling of liquid foodstuffs, such as milk, fruit juices, edible oils, beers, wines, soups and sauces, etc.

As will be appreciated, when the respective disk valve halves 18 and 20 are in the opened position of the coupling, those valve halves are immersed in the conveyed liquid, and, their outwardly presented surfaces, including the peripheries thereof, are immersed in and wetted by that fluid. Again, as taught in U.S. Pat. No. 5,095,946, the arrangement is such that the fluid can not pass into the space between the respective disk halves 18 and 20, sealing members being provided to inhibit the ingress of the liquid between the respective disk halves.

Figure 2:
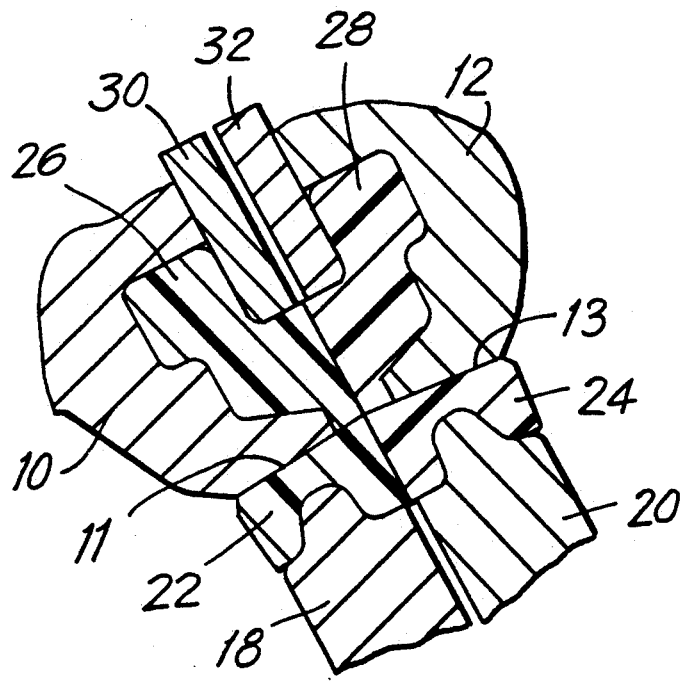
FIG. 2 is an enlarged fragmentary detail of that portion of the valve seating that is encircled by the chain-line A in FIG. 1.
Figure 3:
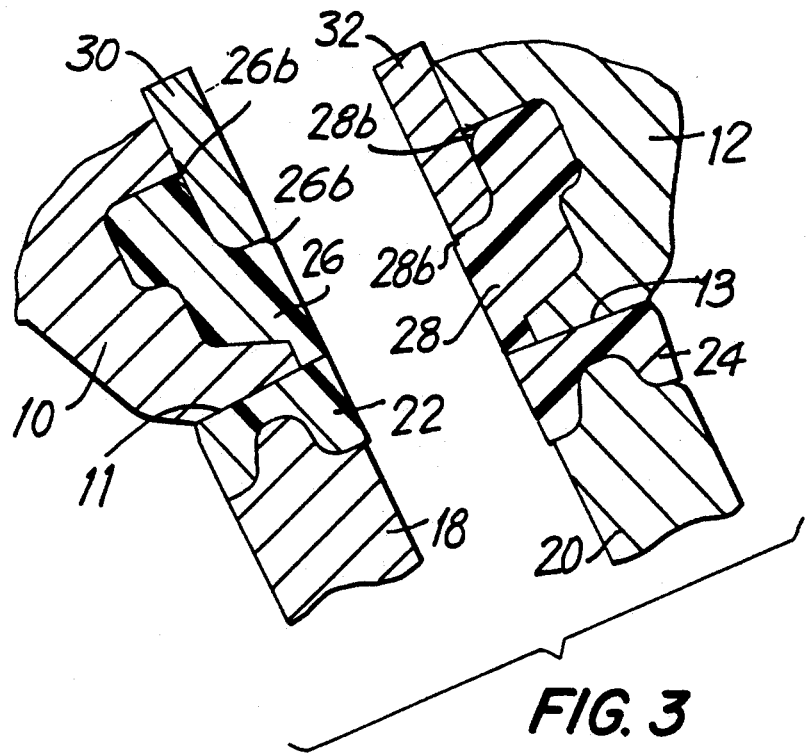
FIG. 3 is a view corresponding with FIG. 2, but showing the two seating portions and wipers when separated one from the other.
Figure 4:
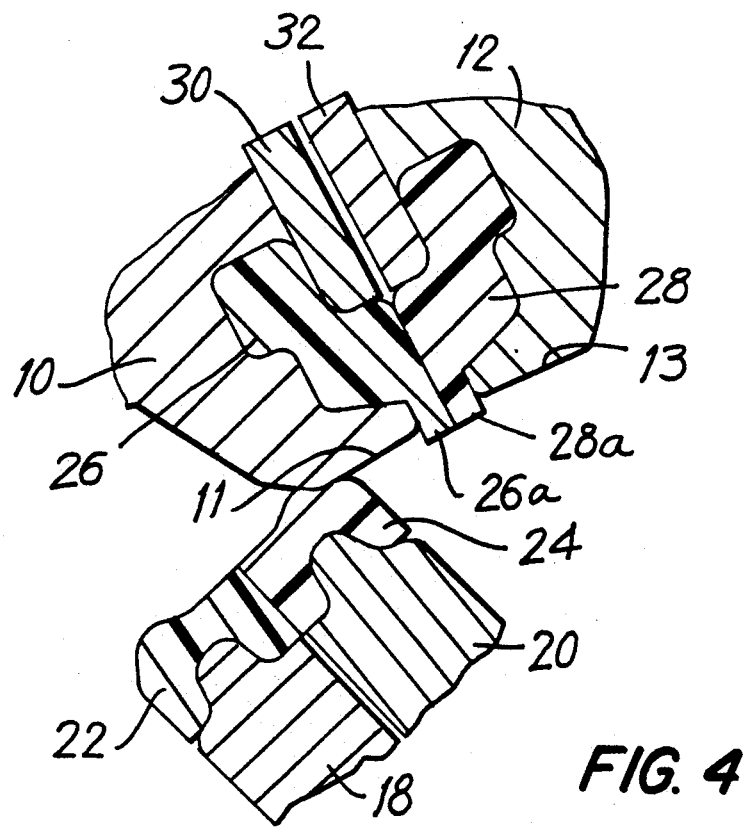
FIG. 4 is a view corresponding with FIG. 1, but showing the valve members in a position that they occupy on approaching full closure of the valve members.

Those sealing members are shown in larger scale in FIGS. 2, 3, and 4, the seal associated with the disk half 18 being shown at 22, and, the seal associated with the disk half 20 being shown at 24.

FIG. 2 is an enlarged scale cross section of the portion A circled in FIG. 1, FIG. 2 showing a fragment of the respective coupling halves 10 and 12, and, a fragment of the disk halves 18 and 20 when in the closed position of the valve.

Positioned and secured within the juxtaposed end faces of the coupling halves 10 and 12, and encircling the periphery of the composite valve member 18, 20, are wiper members 26 and 28. The wiper members are secured to the respective coupling halves 10 and 12 by means of annular rings 30 and 32, which respectively are attached directly to the coupling half 10 and the coupling half 12 by screws (not shown). In this manner, the wiper members 26 and 28 are secured within the end faces of the respective coupling halves 10 and 12 in a manner that permits limited movement between the respective wiper members 26 and 28 relative to the coupling halves 10 and 12, while at the same time, the wiper members 26 and 28 remain firmly attached to their associated coupling half 10 or 12.

The respective wiper members 26 and 28 each include a wiper lip 26a, 28a that extends in a direction radially inwardly of the longitudinal axis of the coupling, and which, as is illustrated in FIG. 4, extend radially inwardly beyond the valve seats 11 and 13 provided by the respective coupling halves 10 and 12. In FIG. 4, the disk valve halves 18 and 20 are shown approaching the valve seats 11 and 13, the leading edge of the seal 24 at that time being progressively compressed into sealing engagement with the valve seat 11. This results in a radially inwards displacement of the sealing member 24, which progressively proceeds to the sealing member 22, as is illustrated in FIG. 2.

At that time, and up to separation of the coupling halves, the seals 22 and 24 are in compressive face engagement with each other, this eliminating any seepage of the fluid into stages that possibly exist between the juxtaposed side faces of the valve discs 18 and 20.

Further, during the progression of the sealing members 24 and 22 into position on the respective valve seats 11 and 13, the mutually presented side faces of the respective sealing members 22 and 24 are caused to pass under the sealing lips 26a and 28a. In the process, this wipes any residual liquid from the outer periphery of the sealing members, while at the same time, the sealing lips 26a and 28a are forced radially outwards for them further to increase the compressive force exerted on the sealing members 22 and 24.

Ultimately, the sealing members reach the position shown in FIG. 2, at which time the wipers 26a and 28a have wiped clean the underlying surface of the sealing members 22 and 24, leaving the juxtaposed surfaces both clean and devoid of any pockets of the conveyed liquid.

At that time, the respective coupling halves 10 and 12 are firmly attached one to the other, the movement of the wiper members 26a and 28a having in turn increased the compressive force exerted between the respective wiper members, and, having increased the compressive force acting on the outer peripheries of the seal members 22 and 24. This acts effectively to squeeze out any remaining minor traces of the liquid contaminants that initially were present on the sealing members 22 and 24.

At that time, and as illustrated in FIG. 3, the respective coupling halves 10 and 12 can be separated one from the other in the absence of any spillage of the conveyed liquid, the respective coupling halves then being fully sealed and closed by the associated disk valve half 18 or 20 and its associated sealing member 22 and 24, which is at that time fully seated on the associated valve member 11 or 13, the wiper members 26 and 28 then acting to further enhance the effectiveness of the seal.

Figure 5:
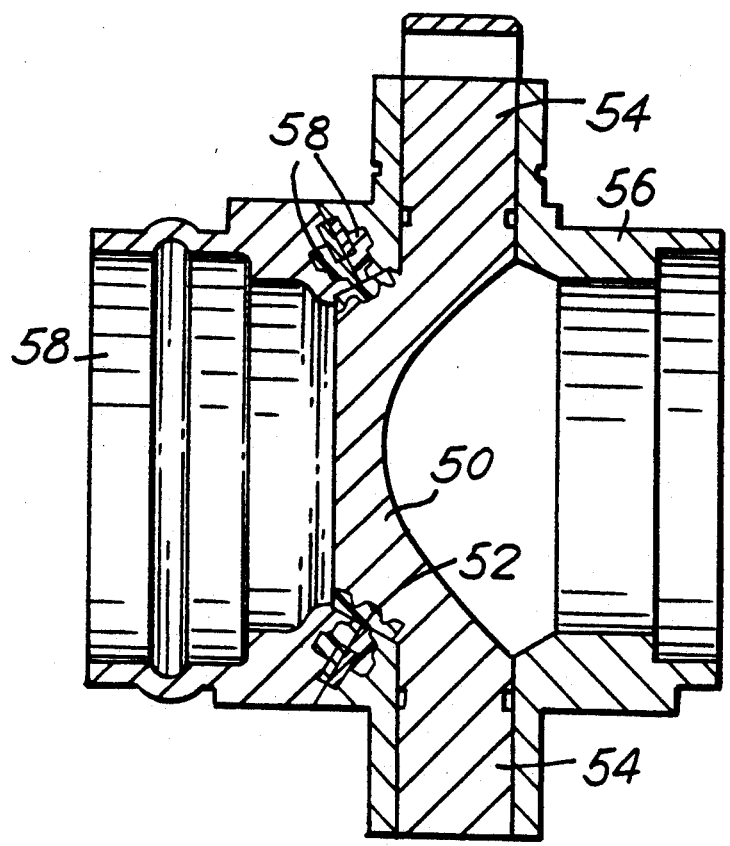
FIG. 5 illustrates in longitudinal cross-section an alternative embodiment of the invention; and, FIG. 6 illustrates in horizontal longitudinal cross-section another alternative according to the present invention.

FIGS. 1 through 4 show the application of the invention in a coupling having identically-formed coupling halves. FIG. 5 shows an embodiment of the invention in which the respective coupling halves are dissimilar, FIG. 6 showing another embodiment of the invention in which the wipers are operative to wipe clean the entire outer surface of the sealing member associated with the valve disk, prior to the periphery of the valve disk traversing the valve seat.

The coupling of FIG. 5 is not a dry break coupling, but instead, is a standard form of coupling incorporating a single disk valve, which effectively is a segment of a ball valve.

In FIG. 5, the disk valve 50 is provided on its outer surface with a seal 52, the disk valve 50 being supported for rotation by a stub shaft 54 that is journalled for rotation in a coupling half 56. Thus, upon rotation of the stub shaft 54 in an appropriate direction, the valve disk 50 is moved into the position shown in FIG. 5, the outer periphery of the seal 52 having wiped clean by wiper members 58 identical with those described with reference to FIGS. 2, 3 and 4. The valve halves 56 and 58 illustrated in FIG. 5 either can be detachable one from the other, or, those halves can be permanently affixed one to the other in order to provide a unitary disk valve construction.

Figure 6:
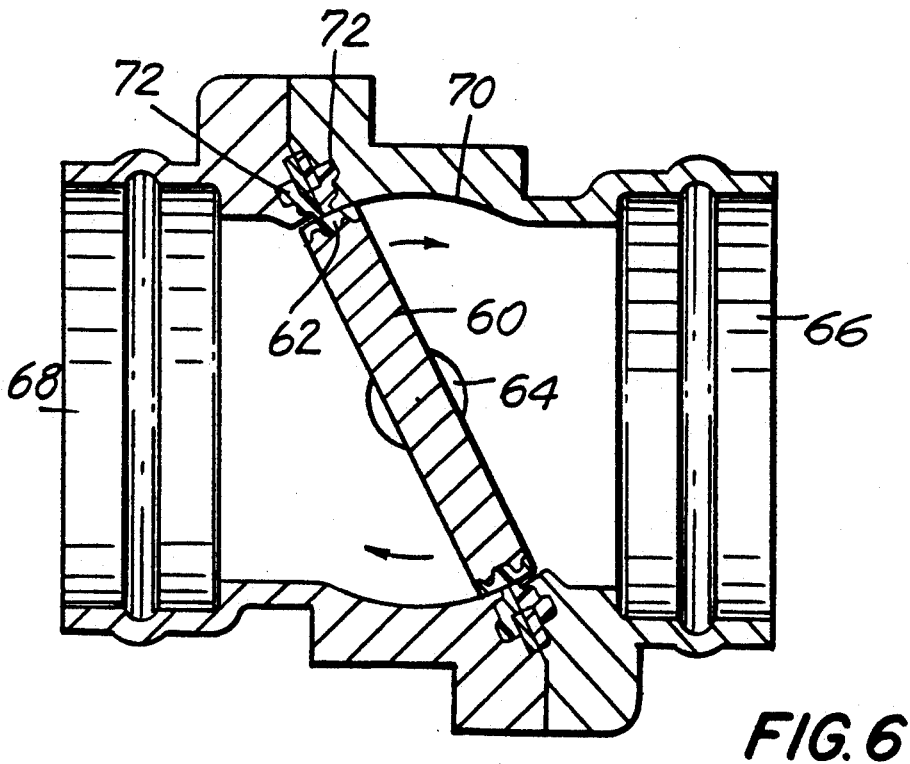

Similarly, in FIG. 6, the valve halves 66 and 68 can either be detachable one from the other, or, they can be permanently affixed to each other. In FIG. 6, a conventional butterfly type disk valve 60 is illustrated, having a peripheral edge seal 62, which, prior to its reaching seating engagement with the valve seat 70, is wiped clean and dry by wiper members 72 identical in construction with those discussed with reference to FIGS. 2, 3 and 4. In FIG. 6, the butterfly valve 60 is supported for rotation within the valve seat 70 by stub shafts 64.

Various other shapes of the wipers will occur to those skilled in the art, as will be the manner of securing the wipers to the associated valve halves, or, securing the wipers within the valve body.

As will be appreciated, due to the fact that elastomers having rubberlike characteristics are essentially incompressible, space must be provided to accommodate displacement of the wiper lips 26 and 28a into the valve seats 10 and 11 under the stress imposed by the valve member.

In the illustrated embodiments, this is provided by minor air filled gaps 26b and 28b provided in the vicinity of the retaining rings 30, 32. Other configurations and positioning of those air gaps will suggest itself, the requirement being that, in the closed condition of the coupling halves, sufficient free space is present to permit retraction of the wiper lips 26a and 28a into the associated valve seat 11, 12.

What is claimed is:

1. A rotary valve of the type having a valve body providing a valve seat, and having a valve member rotatable relative to said valve seat between a first position providing for fluid flow through said valve body and a second position prohibiting fluid flow through said valve body, the improvement comprising:

a wiper member formed from an elastomeric material, said wiper member extending circumferentially of said valve seat, and, in an unstressed condition of said wiper member extending radially inwardly of said valve seat, said wiper member being operatively positioned for it to wipe clean an outer circumferential surface of said valve member as said valve member is moved from said first position to said second position;

means supporting said wiper member for limited radially outwards movement relative to said valve seat, upon stressing of said wiper member by said valve member, whereby said wiper member can retract into said valve seat upon stressing of said wiper member by said rotary valve;

said valve body including complimentary and interfitting valve halves, each of said valve halves including a said valve member;

further including a said wiper member associated with each said valve half, said respective wiper members being operative conjointly to wipe clean at an outer circumferential surface of said valve member associated with that valve half.

2. The rotary valve of claim 1, in which said wiper members in combination are operative to wipe clean an outer circumferential surface of both of said valve members.

3. The rotary valve of claim 1, in which said respective wiper members are positioned within respective annular recesses formed in an end face surface of an associated said housing half, further including a retainer member attached to the associated said end face, said retainer member confining said wiper member within the associated said recess.

* * * * *